United States Patent [19]

Fabbri

[11] Patent Number: 4,624,611
[45] Date of Patent: Nov. 25, 1986

[54] HOUSING STRUCTURE FOR AUTOMATIC BAR LOADERS/FEEDERS

[75] Inventor: Vladimiro Fabbri, Faenza, Italy

[73] Assignee: I.E.M.C.A. S.p.A. Industria Elettromeccanica Complessi Automatici, Faenza, Italy

[21] Appl. No.: 612,493

[22] Filed: May 21, 1984

[30] Foreign Application Priority Data

Jun. 9, 1983 [IT] Italy .................................. 3457 A/83

[51] Int. Cl.$^4$ .............................................. B23B 13/08
[52] U.S. Cl. .......................................... 414/14; 82/2.5
[58] Field of Search ..................................... 414/14–18; 82/2–5

[56] References Cited

FOREIGN PATENT DOCUMENTS 297849 1/1929 United Kingdom .................. 414/17
851666 10/1960 United Kingdom .................. 414/17

Primary Examiner—Terrance L. Siemens
Attorney, Agent, or Firm—Guido Modiano; Albert Josif

[57] ABSTRACT

The box-like elongate main housing or body for automatic bar loaders/feeders comprises a lower portion carried on a bed and an openable upper portion. Each portion is comprised of an inner half-jacket, an outer half-case, and an intervening blanket of a sound-deadening and cushioning material. The two portions are arranged for sealed closure to enclose in the cavity defined between the half-jackets thereof a longitudinal bar guide, the cavity being connectable to a filling and oil lubricating system.

8 Claims, 5 Drawing Figures

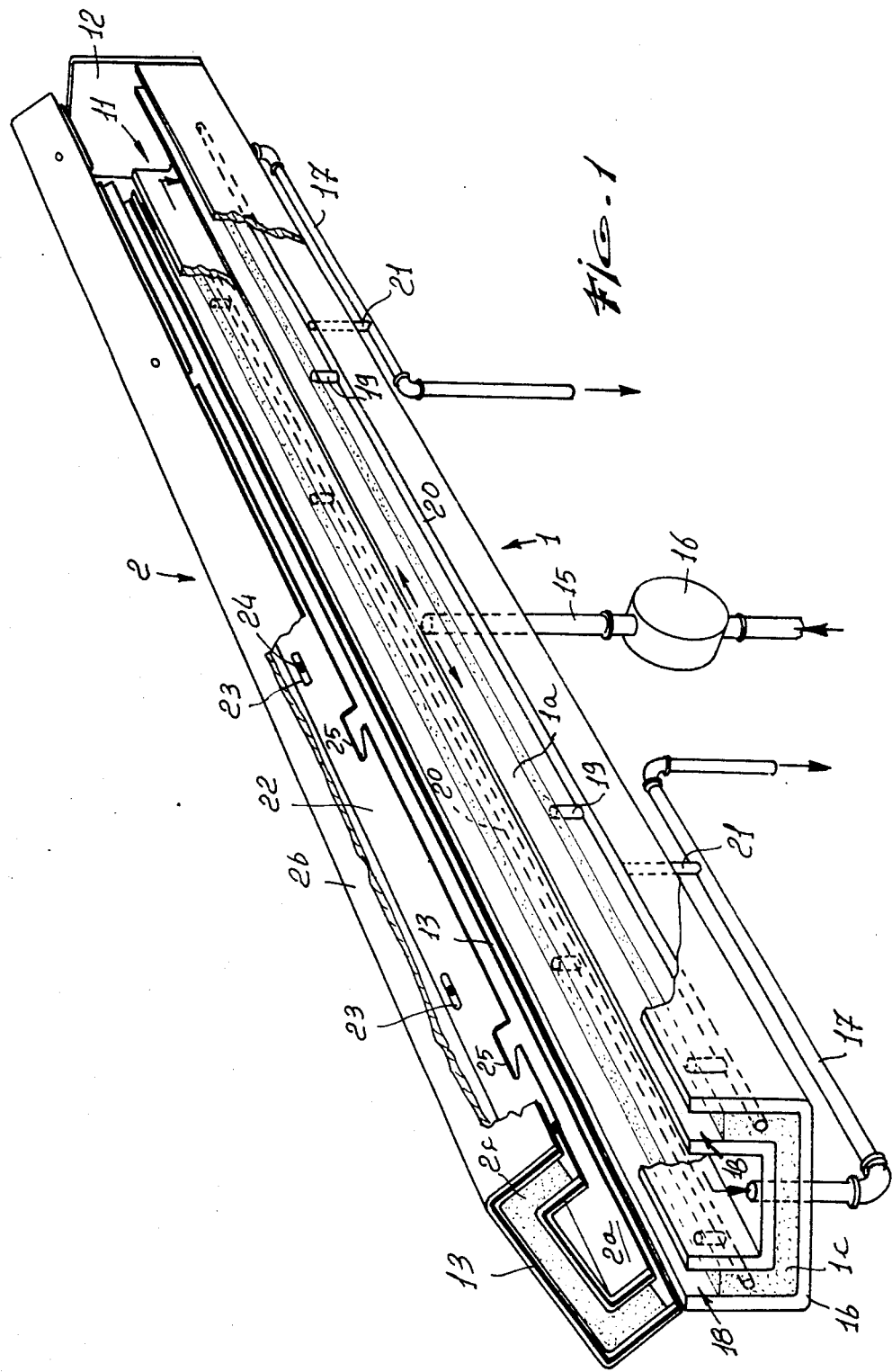

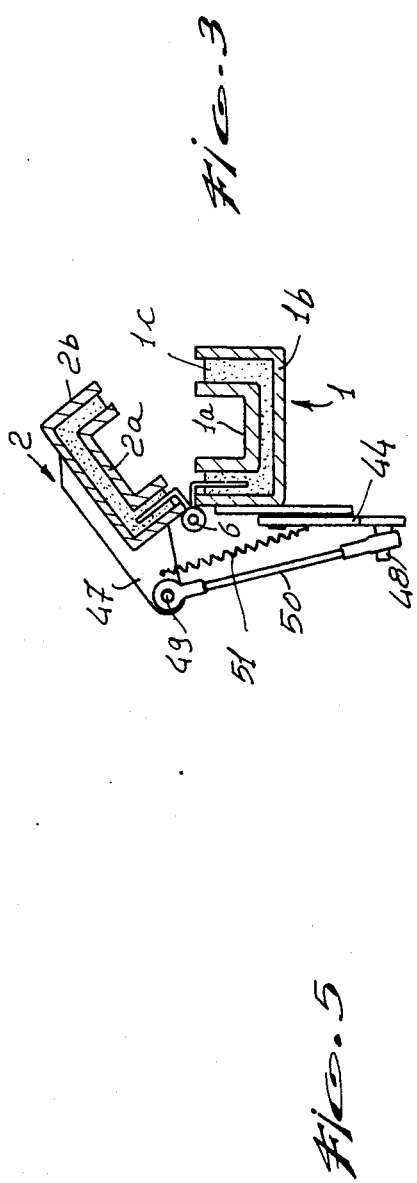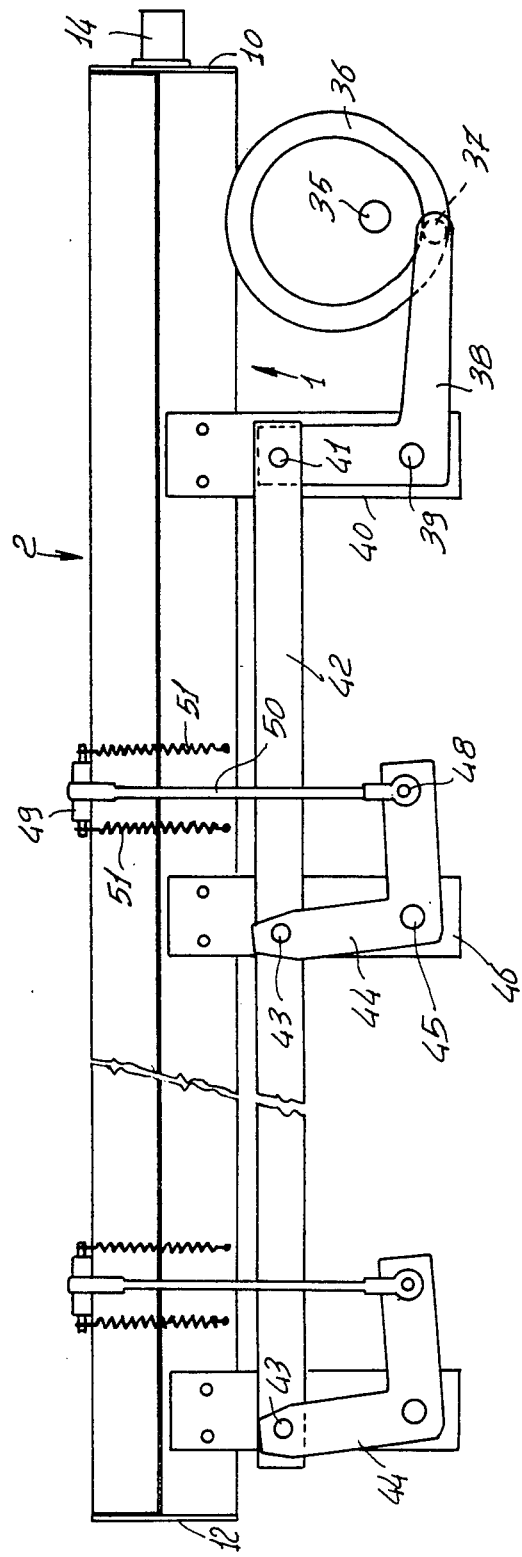

HOUSING STRUCTURE FOR AUTOMATIC BAR LOADERS/FEEDERS

BACKGROUND OF THE INVENTION

This invention relates to a housing structure or main body of automatic bar loaders/feeders.

In such loaders/feeders, beside a bar magazine there extends a body wherein a guide is defined; the guide-body assembly is opened to introduce a bar from the magazine which is then gradually driven toward the front head of the loader and loaded for processing into an automated machine tool.

The bars, which may have a circular or polygonal cross-sectional configuration, are long and occasionally thin and not perfectly straight; during the machining thereof they are rotated at possibly high rpm. Thus, during the bar machining, the loader is subjected to shaking, vibration, and noise emission which detract from the machining process and result in inconvenience to the operators.

SUMMARY OF THE INVENTION

Accordingly, the task of the present invention is to provide a main body of a bar loader/feeder which can obviate such prior drawbacks, and hence, limit and attenuate friction, shocks, and vibrations while preventing propagation of the emitted noise to the working area.

Within that task it is an object to provide such a main body which is constructionally simple, simple to operate, and can operate correctly.

According to one aspect of the invention the above task and objects are achieved by a box-like elongate main housing or body for automatic bar loaders/feeders, comprising a lower portion carried on a bed and an openable upper portion, said body having a bar magazine arranged longitudinally next thereto, characterized in that said two portions each include an inner half-jacket, an outer half-case, and a blanket of a sound-deadening and cushioning material intervening between and interconnecting said half-jacket and half-case, said lower and upper portions sealingly enclosing a longitudinal bar guide within the cavity defined between said half-jackets, said cavity being connectable to a filling and oil lubricating system.

BRIEF DESCRIPTION OF THE DRAWINGS

Further details will become apparent from the following description of a body for bar loaders/feeders according to the invention, as illustrated by way of example in the accompanying drawings, where:

FIG. 1 shows schematically the body of this invention, in the open condition thereof, and in a partially cut-away general perspective view;

FIGS. 2 and 3 are detail views, in vertical cross-section, of this body; and

FIGS. 4 and 5 are partially cut-away longitudinal elevation views showing additional details.

DESCRIPTION OF THE PREFERRED EMBODIMENTS

Figure 4:
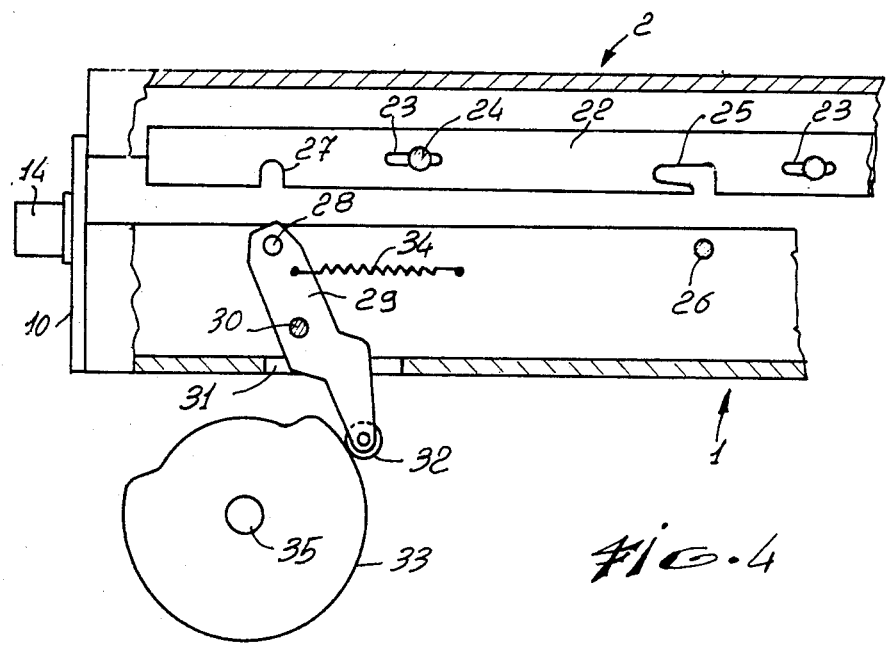

With specific reference to the drawing figures, this box-like, horizontally extending elongate body for automatic bar loaders/feeders is divided longitudinally in two portions, 1 and 2. The lower portion 1 is carried on a bed; the portion 1 is practically supported on two pillers 63 which are adjustable in height relatively to respective pedestals 64 for adapting the loader to different machine tools. Extending in parallel next to the portions 1 and 2 is a bar magazine; in particular, the magazine comprises a set of brackets 5 projecting from one side of the portion 1; for accommodating bars 3, the brackets define a top surface which slopes toward the portion 1. It is preferred that on almost parallel planes to said surface, the portion 1 be secured to the pillar tops and the movable portion 2 abuts in closing on the portion 1 to be symmetrical therewith; however, the mounting plane of the portion 1 and the plane of abutment of the portion 2 thereon may also be horizontal. At the remote side from the magazine 5, the portion 2 is pivoted to the portion 1 by means of a set of coaxially horizontal hinges 6.

Figure 2:
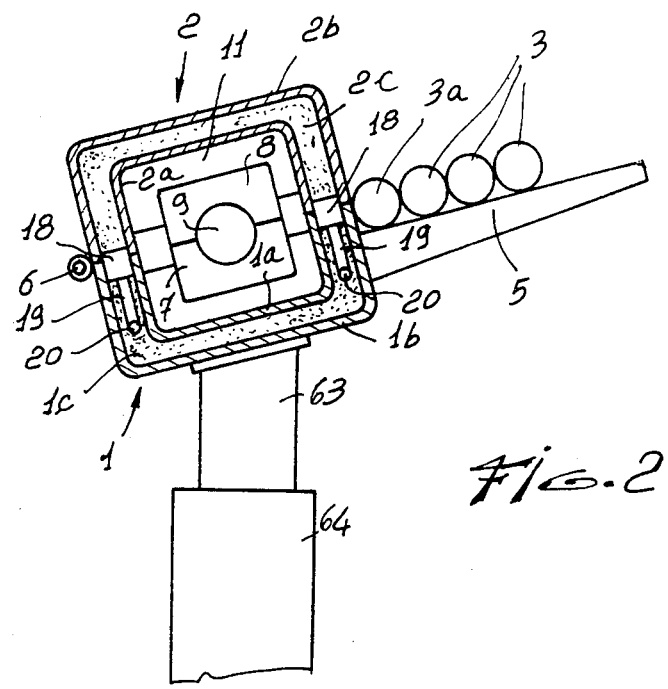

The portion 1 includes an inner half-jacket 1a, a half-case 1b, and a blanket 1c intervening between the half-case and half-jacket. The blanket 1c is formed from a sound-deadening cushioning material, preferably composed of rubber or another elastomer; the half-jacket and half-case are interconnected through the cushioning material and comprise respective sectional members having a substantially U-like cross-sectional configuration. The same applies to the portion 2, wherein indicated at 2a, 2b and 2c are elements similar to 1a, 1b and 1c. Associated inside the half-jackets 1a and 2a are, respectively, the lower portion 7 and upper portion 8 of a longitudinal guide for a bar to be machined; said guide portions, shown in FIG. 2 only, may be of the type disclosed in French Pat. No. 76/00834 to the same Applicant. The guide portion 8 follows substantially the opening and closing movements of the portion 2 of the loader body. Thus, as the body portions 1 and 2 of the loader are opened (FIG. 3), the guide 7-8 is also opened; in this condition, the bar 3a, which is located at the bottom edge of the incline 5, is withdrawn from the bar magazine and placed into the hollow of the portion 7; this is accomplished by a specially provided device. After re-closing the portions 2 and 8 onto the portions 1 and 7, the bar picked up from the magazine stays in the duct 9 defined in the guide 7-8 and is gradually driven out of the loader front head 10 to enter the automatic machine tool. Similar to the guide 7-8, the bar feeding drive is also enclosed within the cavity 11 defined between the half-jackets 1a and 2a.

The front head 10 and rear head 12 are rigid with the portion 1 and permanently close the ends thereof; they extend above said portion 1 so as to also cover the ends of the portion 2 as the latter, in the closing condition, is lowered. In this condition, the body 1-2 becomes substantially fluid-tight; in fact, between the portions 1 and 2 and between the heads 10-12 and portion 2, there are interposed special sealing gaskets; in practice, said gaskets, which are indicated at 13 (FIG. 1), extend along the edges of the sectional members 2a and 2b. With a similar function, ring gaskets are provided inside a sleeve 14 (FIG. 2) which is secured to the head 10 and defines an extension of the duct 9. Such ring gaskets provide a seal between the bar and said sleeve upon each bar coming out of the loader for machining on the machine tool.

The sealing of the body 1-2 is dependent on an oil lubricating system which affects the entire cavity 11. Said system includes an oil delivery pipe 15 of a pump 16, which opens into the cavity 11 at the bottom of the half-jacket 1a; it also includes oil return pipes 17 leading from said bottom. As the body 1-2 is closed and the bar to be machined reaches the sleeve 14, the pump 16 will fill the cavity 11 with oil to then establish, through the return pipes 17, a forced circulation lubrication. The suitably thick oil reaches, through specially provided passages, the interior of the duct 9, thereby the separation of the duct surface from that of the bar will be of a more fluid static or fluid-dynamic type according to low or high rotational speed values at which the bar is driven by the machine tool during the machining thereof. As the machine has completed the bar machining, and the bar pusher, with the remaining bar length, in on the point of returning to the head 12, the cavity 11 is emptied of the oil through the pipes 17, so that the body 1-2 can be re-opened for the introduction of a fresh bar. Where, during the forced circulation of oil, some oil leaks past the edges of the half-jackets 1a and 2a, the leakage would collect at the bottom of the channels 18, which are defined at the upper portion of the space between the half-jacket 1a and half-case 1b, owing to the blanket 1c filling said space only incompletely. From the bottoms of the channels 18, the oil leakage flows, through vertical passages 19, down into respective longitudinal headers 20, and hence, through the connection conduits 21, into the recovery pipes 17.

To securely close the portion 2 onto the portion 1, there is provided a latch comprising a flat rod 22 extending along the longitudinal edge of the portion 2 facing the magazine 5; said rod is mounted slidably along said edge and depends therefrom. In particular, the direction of lay of the rod 22 extends inside the space defined between the corresponding arms of the half-jacket 2a and half-case 2b, and has there its top strip accommodated in a respective hollow in the blanket 2c and provided with a set of longitudinal slots 23 which are engaged by respective pins 24 made rigid with the portion 2. Formed along the bottom edge of the rod 22 are a set of contoured notches 25; with such notches, there correspond pins 26 which are secured transversely to the portion 1, at the top of the latter which is near the magazine 5. With the portion 2 brought close to the portion 1, a notch 27 in the bottom edge of the rod 22 is further engaged by a pin 28 made rigid with the end of an arm of a lever 29 which projects from the plane of the lever itself. The lever 29 is pivoted at 30 to the portion 1 and is set for oscillation in a throughgoing seat formed in the space which is defined between the corresponding arms of the half-jacket 1a and half-case 1b. The other arm of the lever 29 protrudes out of the bottom of the case 1b, at the slot 31 formed therein, and carries at its end a small roller 32 which is held in engagement with the contoured edge of a cam 33. That engagement is provided by a tension spring 34 which is interposed between the arm of the lever 29 and portion 1. The cam 33 is keyed to the output shaft 35 of a gear motor which follows the loader operating cycle. Thus, as the portion 2 moves down and abuts on the portion 1, the lever 29, being governed by the cam 33 via the engagement of 28, 27, causes a horizontal displacement of the rod 22 of the latch, thereby the pins 26, which were located at the inlets of the notches 25, move to the bottoms of said notches; thus, the portion 2 is clamped to the portion 1. A reverse horizontal displacement is instead produced by the lever 29 to release the portion 2 from the portion 1, so that the portion 2 can be raised and brought to a condition of open loader body.

The raising and lowering of the portion 2 are governed by a channel cam 36, also keyed to the shaft 35. A small roller 37 engages in fact in the contoured channel of said cam which is mounted on the end of an arm of a bellcrank lever 38 pivoted at 39 to a lug 40 outside of the half-case 1b. Articulated to the end of the other arm of the lever 38, at 41, is a longitudinal rod 42. Articulated to said rod, at locations 43, are respective bellcrank levers 44 which are pivoted at 45 to lugs 46 of the half-case 1b. Between each lever 44 and a corresponding bracket 47 of the half-case 2b, there is interposed, through suitable respective swivel joints 48 and 49, a related connecting rod 50. The entire drive for raising and lowering the portion 2 is located on that loader side which corresponds to the hinges 6. To be noted is the provision of the tension springs 51 which, being interposed between the brackets 47 and half-case 1b, are able to counter-balance the weight of the portion 2, thereby no special power rating is required of the gear motor driving the shaft 35, even though the portion 2 may have a sizeable weight.

The housing or body for bar loaders/feeders, as herein described and illustrated, achieves, therefore, its objects.

In practicing the invention, it is susceptible to many modifications and variations without departing from the scope claimed herein below; further, the shapes, materials, and dimensions may be any suitable ones to meet individual requirements.

What is claimed is:

1. A box-like main body for automatic feeders, comprising a lower portion, a bed an openable upper portion and a bar magazine, said lower portion being carried on said bed, said bar magazine being arranged longitudinally next to said body, said lower portion and said upper portion comprising an inner half-jacket, an outer half-case, a cavity, a longitudinal bar guide, and a blanket, said blanket being composed of sound deadening and cushioning material, intervening between and interconnecting said inner half-jacket and said outer half case, said cavity being sealingly defined between said lower portion and said upper portion and enclosing said longitudinal bar guide, said box-like main body further comprising a filling and oil lubricating system, said cavity being connectable to said filling and oil lubricating system.

2. A body according to claim 1 further comprising a latch, said lower portion and said upper portion defining portions, one of said portions having a side adjacent said bar magazine, an other of said portions having pins, said latch being mounted for sliding longitudinally with respect to said one of said portions at said side adjacent said bar magazine and being arranged to engage with said pins on said other portion, said body further comprising gaskets, said gaskets being interposed between said lower portion and said upper portion.

3. A body according to claim 2 further comprising cyclic cams, a longitudinal rod, and linkages, said latch and said longitudinal rod being adopted for reciprocating sliding movements in a longitudinal direction, said cyclic cams being adapted for governing said reciprocating sliding movements of said latch and said longitudinal rod in said longitudinal direction, said linkages being adopted for connecting said longitudinal rod to said upper portion, for opening and closing said upper portion about said hinges and with respect to said lower portion.

4. A body according to claim 1, wherein said filling and oil lubricating system comprises an oil delivery pipe, a pump, and oil return pipes having inlets, said oil delivery pipe being supplied from said pump and opening into said cavity at said lower portion of said body, said oil return pipes having said inlets thereof located at said lower portion, said filling and oil lubricating system being controlled such that, with said body in a sealed condition said cavity, is filled with oil and a forced oil circulation is established therein, said cavity being adapted to be emptied prior to re-opening said lower portion and said upper portion of said body.

5. A body according to claim 1 wherein said inner half-jacket has edges, wherein said filling and oil lubricating system comprises oil return and recovery pipes and wherein said lower portion and said upper portion each comprise two sectional members said two sectional members each having a U-like cross section configuration said inner half-jacket and said outer half-case being defined by said two sectional members, at least said lower portion further comprising channels, said two sectional members having arm pairs, said channels being defined upwardly and extending longitudinally between said arm pins of said two sectional members, said channels being adapted for collecting any oil leaking past said edges of said inner half-jacket and being connected to said return and recovery pipes.

6. A body according to claim 1, further comprising an opposed side having a longitudinal axis and springs said lower portion and said upper portion being hinged together along said longitudinal axis of said opposed side, said body further comprising a side adjacent said bar magazine, said opposed side being located opposite to said side adjacent said bar magazine, said upper portion having a weight, said springs being adapted for intervening between said lower portion and said upper portion for counterbalancing the weight of said upper portion.

7. A body according to claim 1 further comprising pillars and respective base pedestals, said pillars being supported on said respective base pedestals, said lower portion being carried on said pillars, said pillars being adjustable in height on said respective base pedestals.

8. A body according to claim 1 further comprising pillars, a side adjacent to said bar magazine, a downward sloping plane and an opposed side, said upper portion being adapted for abutment engagement with said lower portion, said lower portion being attached to said pillars and lying on said downward sloping plane, said opposed side being located opposite to said side adjacent said bar magazine, said bar magazine also lying in said downward sloping plane.

* * * * *